United States Patent
Liu et al.

(10) Patent No.: US 10,031,250 B2
(45) Date of Patent: Jul. 24, 2018

(54) METHOD AND APPARATUS OF DETERMINING STIFFNESS COEFFICIENTS OF FORMATION

(71) Applicant: PetroChina Company Limited, Beijing (CN)

(72) Inventors: Zhonghua Liu, Beijing (CN); Lianteng Song, Beijing (CN); Cancan Zhou, Beijing (CN); Chaoliu Li, Beijing (CN); Jixin Deng, Beijing (CN); Changxi Li, Beijing (CN); Xiangzhi Cheng, Beijing (CN); Xia Li, Beijing (CN); Chao Yuan, Beijing (CN); Qiangfu Kong, Beijing (CN); Song Hu, Beijing (CN); Hongjun Xu, Beijing (CN); Baoyin Xue, Beijing (CN); Peiyuan Zhang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 262 days.

(21) Appl. No.: 14/984,013

(22) Filed: Dec. 30, 2015

(65) Prior Publication Data
US 2016/0186557 A1 Jun. 30, 2016

(30) Foreign Application Priority Data
Dec. 30, 2014 (CN) .......................... 2014 1 0842028

(51) Int. Cl.
*G01V 1/50* (2006.01)
*G01V 1/40* (2006.01)

(52) U.S. Cl.
CPC ............ *G01V 1/40* (2013.01); *G01V 2210/62* (2013.01)

(58) Field of Classification Search
CPC .... G01V 1/306; G01V 2210/62; G01V 1/288; G01V 2200/16; E21B 43/26; E21B 47/16; E21B 49/003; E21B 49/006; E21B 7/046
See application file for complete search history.

(56) References Cited

U.S. PATENT DOCUMENTS

| 6,351,991 | B1 * | 3/2002 | Sinha | ..................... E21B 49/006 367/27 |
| 7,751,980 | B2 * | 7/2010 | Yan | .......................... G01V 1/40 367/25 |

(Continued)

FOREIGN PATENT DOCUMENTS

| CN | 101630014 B | 10/2011 |
| CN | 102466818 A | 5/2012 |

(Continued)

OTHER PUBLICATIONS

Examination Report for Corresponding AU Application No. 2015275302 dated Feb. 27, 2017, 4 pages.

(Continued)

*Primary Examiner* — Jaehwan Oh
(74) *Attorney, Agent, or Firm* — Hoffman Warnick LLC

(57) ABSTRACT

The present invention proposes a method and apparatus of determining stiffness coefficients of formation, wherein the method comprising: setting up a relation of stiffness coefficients of formation $C_{11}$ and $C_{33}$, $C_{44}$, $C_{66}$ based on stiffness coefficients of a formation core sample; computing clay content of formation along depth continuously based on formation logging information; computing the stiffness coefficient of formation $C_{33}$ along depth continuously based on a P-wave velocity and a volume density of the formation; computing the stiffness coefficient of formation $C_{44}$ along depth continuously based on a S-wave velocity and a volume density of the formation; and then computing the stiffness coefficients of formation $C_{11}$ and $C_{66}$ along depth (Continued)

continuously based on the calculations above, the relation of stiffness coefficients of formation $C_{11}$ and $C_{33}$, $C_{44}$, $C_{66}$, and a relation of an anisotropy coefficient of the P-wave of the formation and its clay content or a relation of an anisotropy coefficient of the S-wave of the formation and its clay content. The present invention does not need to calculate stiffness coefficients by using a horizontal S-wave velocity inversed from the extracted stoneley waves, and avoids an extraction process of horizontal S-wave, such that the calculation is simple and effective.

12 Claims, 8 Drawing Sheets

(56) References Cited

U.S. PATENT DOCUMENTS

| | | | |
|---|---|---|---|
| 2003/0125878 A1 | 7/2003 | Bakulin et al. | |
| 2009/0210160 A1* | 8/2009 | Suarez-Rivera | G01V 11/00 702/6 |
| 2010/0312534 A1* | 12/2010 | Xu | G01V 1/50 703/2 |
| 2015/0012251 A1* | 1/2015 | Horne | G01V 1/306 703/2 |
| 2016/0131787 A1* | 5/2016 | Quirein | G01V 5/101 166/250.01 |

FOREIGN PATENT DOCUMENTS

| | | |
|---|---|---|
| CN | 103323575 A | 9/2013 |
| CN | 103628866 A | 3/2014 |
| CN | 103792581 A | 5/2014 |
| CN | 102706965 B | 8/2014 |
| JP | 2004137791 A | 5/2004 |

OTHER PUBLICATIONS

Thomsen, "Weak elastic anisotrpy," Geophysics. 51(10):1954-66 (1986).
Wang, "Seismic anistropy in sedimentary rocks, part 1: A single-plus labaratory method," Geophysics. 67(5):1415-22 (2002).
Wang, "Seismic anisotropy in sedimentary rocks, part 2: Laboratory data," Geophysics. 67(5)1423-40 (2002).
Tang, "Determining formation shear-wave transverse isotropy from borehole Stoneley-wave measurements," Geophysics. 68(1):118-26 (2003).
First Office Action for CN Application No. 201410842028.X, dated Dec. 14, 2016, 11 pages.
Klimentos, "The effects of porosity-permeability-clay content on the velocity of compressional waves", Geophysics, vol. 56, No. 12 (Dec. 1991); pp. 1930-1939.
"Analysis method for clay minerals and ordinary non-clay minerals in sedimentary rocks by the X-ray diffraction", National Energy Board, 2010, 47 pages.
Best et al., "The relationships between the velocities, attenuations and petrophysical properties of reservoir sedimentary rocks", Geophysical Prospecting, 1994, 42, pp. 151-178.
Audoin, et al. "Measurement of stiffness coefficients of anisotropic materials from pointlike generation and detection of acoustic waves" Journal of Applied Physics 80, 3760 (1996), 13 pages.
Wang et al., "Modification of the Inversion Method for Anisotropy from Acoustic Logging Data", Technical Acoustics, vol. 28, Period 2, 3 pages.
Search Report for CN Application No. 201410842028.X, dated Dec. 14, 2016, 6 pages.

* cited by examiner

METHOD AND APPARATUS OF DETERMINING STIFFNESS COEFFICIENTS OF FORMATION

CROSS-REFERENCE TO RELATED APPLICATIONS

This application claims the benefit of co-pending Chinese Patent Application No. 201410842028.X, filed 30 Dec. 2014, which is hereby incorporated herein as though fully set forth.

FIELD OF THE INVENTION

The present invention relates to a technical field of petroleum exploration well logging, in particular to a method and apparatus of determining stiffness coefficients of formation.

BACKGROUND OF THE RELATED ART

Stiffness coefficients are critical parameters necessary in a process of evaluating rock mechanical properties using well logging data in unconventional oil-gas reservoirs represented by tight oil and gas, shale oil gas. Stiffness coefficients specifically include parameters, such as $C_{33}$, $C_{44}$, $C_{11}$, $C_{13}$, and $C_{66}$ and the like, wherein the logging calculation method of such two stiffness coefficients $C_{66}$ and $C_{11}$ is a difficult problem in the field of evaluating rock mechanical properties using well logging data in unconventional oil-gas reservoirs in recent years. In order to solve this difficult problem, the idea previously employed is first inverting horizontal S-wave velocity in the stoneley waves extracted from array acoustic logging information, then calculating $C_{66}$ by combining it with volume density logging curves, and finally realizing a logging calculation of stiffness coefficients such as $C_{11}$ and the like by further utilizing an experimental relation among five stiffness coefficients based thereon. There are obvious limitations to this approach, the main reason is stoneley waves are less sensitive to the horizontal S-wave velocity with larger extraction errors and lower confidences in a fast formation. It is pointed out in paper "Determining formation shear-wave transverse isotropy from borehole stoneley-wave measurements, Xiaoming Tang, Geophysics. Vol. 68, No. 1, 2003" that an approach of extracting a horizontal S-wave velocity from stoneley waves for logging applies only to a slow formation. And the process of extracting horizontal S-wave velocity from stoneley waves is also very complicated, those of ordinary skill in the art find it difficult to implement.

SUMMARY OF THE INVENTION

Examples of the present invention provide a method of determining stiffness coefficients of formation, which does not need to calculate stiffness coefficients by using horizontal S-wave velocity inversed in the stoneley waves extracted from array acoustic logging information, thereby avoiding an extraction process of horizontal S-wave, such that the calculation is simple and effective; more importantly, this method applies to a calculation of stiffness coefficients of fast formation besides slow formation, and has a wider scope of application. The method comprising:
depending on stiffness coefficients of a formation core sample, setting up a relation of stiffness coefficients of formation $C_{11}$ and $C_{33}$, $C_{44}$, $C_{66}$ based on stiffness coefficients of a formation core sample; computing clay content of the formation along depth continuously based on formation logging information; computing the stiffness coefficient of the formation $C_{33}$ along depth continuously based on a P-wave velocity and a volume density of the formation; computing the stiffness coefficient of the formation $C_{44}$ along depth continuously based on a S-wave velocity and a volume density of the formation;
computing the stiffness coefficient of the formation $C_{11}$ along depth continuously based on a relation of an anisotropy coefficient of the P-wave of the formation and its clay content, the clay content of the formation, and the stiffness coefficient of the formation $C_{33}$, and further computing the stiffness coefficient of the formation $C_{66}$ along depth continuously based on the relation of the stiffness coefficients of the formation $C_{11}$ and $C_{33}$, $C_{44}$, $C_{66}$ and the stiffness coefficients of the formation $C_{11}$, $C_{33}$, $C_{44}$ alternatively, computing the stiffness coefficient of the formation $C_{66}$ along depth continuously based on a relation of an anisotropy coefficient of the S-wave of the formation and its clay content, the clay content of the formation, and the stiffness coefficient of the formation $C_{44}$, and further computing the stiffness coefficient of the formation $C_{11}$ along depth continuously based on the relation of the stiffness coefficients of the formation $C_{11}$ and $C_{33}$, $C_{44}$, $C_{66}$ and the stiffness coefficients of the formation $C_{33}$, $C_{44}$, $C_{66}$.

Examples of the present invention further provide an apparatus of determining stiffness coefficients of formation, which does not need to calculate stiffness coefficients by using a horizontal S-wave velocity inversed in the stoneley waves extracted from array acoustic logging information, thereby avoiding an extraction process of horizontal S-wave, such that the calculation is simple and effective; more importantly, this method applies to a calculation of stiffness coefficients of fast formation besides slow formation, and has a wider scope of application. The apparatus comprising a processor that is configured to:
depending on stiffness coefficients of a formation core sample, setting up a relation of stiffness coefficients of formation $C_{11}$ and $C_{33}$, $C_{44}$, $C_{66}$ based on stiffness coefficients of a formation core sample; computing clay content of the formation along depth continuously based on formation logging information; computing the stiffness coefficient of formation $C_{33}$ along depth continuously based on a P-wave velocity and a volume density of the formation; computing the stiffness coefficient of formation $C_{44}$ along depth continuously based on a S-wave velocity and a volume density of the formation;
computing the stiffness coefficient of the formation $C_{11}$ along depth continuously based on a relation of an anisotropy coefficient of the P-wave of the formation and its clay content, the clay content of the formation, and the stiffness coefficient of the formation $C_{33}$, and further computing the stiffness coefficient of the formation $C_{66}$ along depth continuously based on the relation of the stiffness coefficients of the formation $C_{11}$ and $C_{33}$, $C_{44}$, $C_{66}$ and the stiffness coefficients of the formation $C_{11}$, $C_{33}$, $C_{44}$, alternatively, computing the stiffness coefficient of the formation $C_{66}$ along depth continuously based on a relation of an anisotropy coefficient of the S-wave of the formation and its clay content, the clay content of the formation, and the stiffness coefficient of the formation $C_{44}$, and further computing the stiffness coefficient of the formation $C_{11}$ along depth continuously based on the relation of the stiffness coefficients of the formation $C_{11}$ and $C_{33}$, $C_{44}$, $C_{66}$ and the stiffness coefficients of the formation $C_{33}$, $C_{44}$, $C_{66}$.

In examples of the present invention, it is unnecessary to calculate stiffness coefficients by using a horizontal S-wave velocity inversed in the stoneley waves extracted from array acoustic logging information, thereby avoiding an extraction process of horizontal S-wave, such that the calculation is simple and effective; more importantly, this method applies to a calculation of stiffness coefficients of fast formation besides slow formation, and has a wider scope of application.

EXPLANATIONS OF THE ACCOMPANYING DRAWINGS

The accompanying drawings, which are demonstrated herein to provide a further understanding of the invention, constitute a part of this application, and are not to be construed to limit the invention. In the drawings.

SPECIFIC EMBODIMENTS FOR CARRYING OUT THE INVENTION

To make the purpose, technical proposal and advantages of the present invention more apparent, the present invention is further illustrated in conjunction with embodiments and appended drawings below. Herein, illustrative embodiments of the invention and the description thereof are intended to illustrate the present invention but not limit the present invention.

The existing method of calculating stiffness coefficients of formation needs to utilize a horizontal S-wave velocity obtained from inversion of stoneley waves, but this method has substantial limitations, generally applies only to a slow formation, and the process of extracting horizontal S-wave velocity from stoneley waves is also very complicated, so that the process of calculating the stiffness coefficients of formation also becomes complicated, general logging explanation personnel have difficulties in mastery. Inventors proposes a new method, which is unnecessary to use a horizontal S-wave velocity when stiffness coefficients of formation are calculated, and hence an extraction process of horizontal S-wave can be avoided, and this method has a wider scope of application, applies to not only a slow formation but also a fast formation, and possibly solves the above-mentioned problems that exist in the prior art. A detailed description is provided below.

Figure 1:
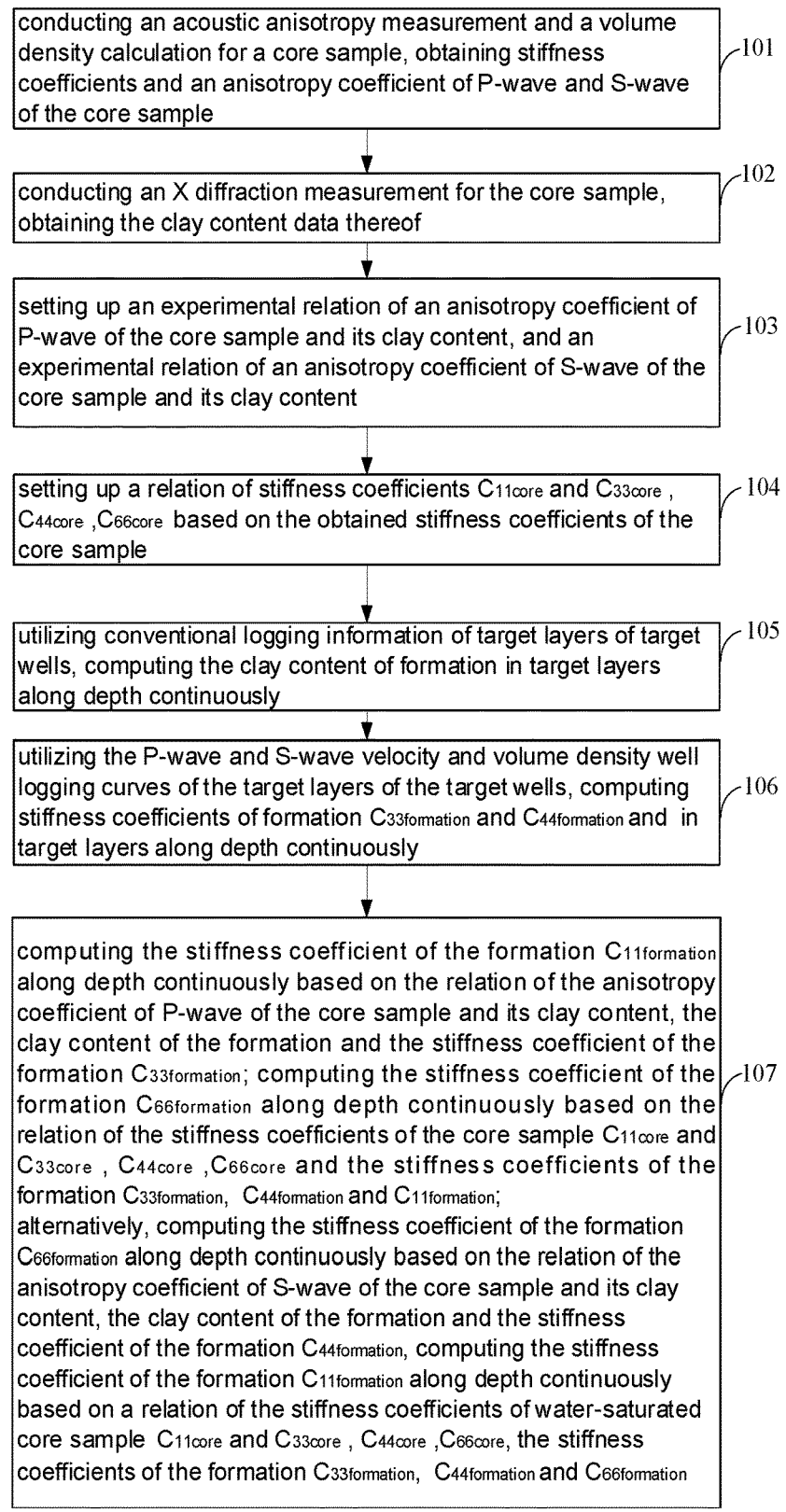
FIG. 1 is a flow chart of a new method of calculating stiffness coefficients of formation in examples of the present invention.

FIG. 1 is a flow chart of a new method of calculating stiffness coefficients of formation in examples of the present invention, as shown in FIG. 1, the method comprising:

step 101: conducting an acoustic anisotropy measurement and a volume density calculation for a core sample, obtaining stiffness coefficients and an anisotropy coefficient of P-wave and S-wave of the core sample;

step 102: conducting an X diffraction measurement for the core sample, obtaining the clay content data thereof;

step 103: setting up an experimental relation of an anisotropy coefficient of P-wave of the core sample and its clay content, and an experimental relation of an anisotropy coefficient of S-wave of the core sample and its clay content;

step 104: setting up a relation of stiffness coefficients $C_{11core}$ and $C_{33core}$, $C_{44core}$, $C_{66core}$ based on the obtained stiffness coefficients of the core sample;

step 105: utilizing conventional logging information of target layers of target wells, computing the clay content of formation in target layers along depth continuously;

step 106: utilizing the P-wave and S-wave velocity and volume density well logging curves of the target layers of the target wells, computing stiffness coefficients of formation $C_{33\,formation}$ and $C_{44\,formation}$ in target layers along depth continuously;

step 107: computing the stiffness coefficient of the formation $C_{11\,formation}$ along depth continuously based on the relation of the anisotropy coefficient of P-wave of the core sample and its clay content, the clay content of the formation and the stiffness coefficient of the formation $C_{33\,formation}$; computing the stiffness coefficient of the formation $C_{66\,formation}$ along depth continuously based on the relation of the stiffness coefficients of the core sample $C_{11core}$ and $C_{33core}$, $C_{44core}$, $C_{66core}$ and the stiffness coefficients of the formation $C_{33\,formation}$, $C_{44\,formation}$ and $C_{11\,formation}$;

alternatively, computing the stiffness coefficient of the formation $C_{66\,formation}$ along depth continuously based on the relation of the anisotropy coefficient of S-wave of the core sample and its clay content, the clay content of the formation and the stiffness coefficient of the formation $C_{44\,formation}$; computing the stiffness coefficient of the formation $C_{11\,formation}$ along depth continuously based on a relation of the stiffness coefficients of water-saturated core sample $C_{11core}$ and $C_{33core}$, $C_{44core}$, $C_{66core}$, the stiffness coefficients of the formation $C_{33\,formation}$, $C_{44\,formation}$ and $C_{66\,formation}$;

The relation of stiffness coefficients $C_{11core}$ and $C_{33core}$, $C_{44core}$, $C_{66core}$ can be used as the relation of stiffness coefficients $C_{11\,formation}$ and $C_{33\,formation}$, $C_{44\,formation}$, $C_{66\,formation}$; the relation of the anisotropy coefficient of P-wave of the core sample and its clay content can be used as the relation of the anisotropy coefficient of the P-wave of the formation and its clay content; the relation of the anisotropy coefficient of S-wave of the core sample and its clay content can be used as the relation of the anisotropy coefficient of the S-wave of the formation and its clay content.

For example, the preparation method of a core sample is coring along a direction parallel to formation bedding in the full-diameter core obtained from important exploration wells, the core samples required for experiment are obtained after water saturating the obtained horizontal plunger-like core (in other words, water saturating a core sample).

Figure 2:
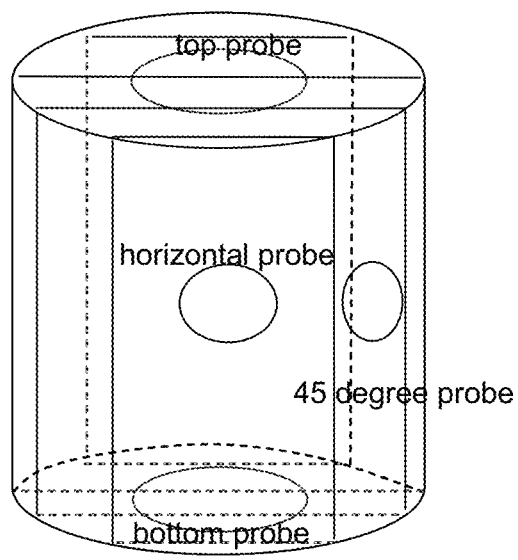
FIG. 2 is a principle diagram of measuring an acoustic anisotropy through a single core measurement method in examples of the present invention.

Conducting an acoustic anisotropy measurement for the core sample using an individual core measurement method, the principle is as shown in FIG. 2, referring to paper "Seismic anisotropy in sedimentary rocks; Part 1: A single-plug laboratory method", Zhijing Wang, Geophysics. Vol. 67, No. 5, 2002 for said individual core measurement method.

In FIG. 2, there are three groups of probes on top and bottom of the core sample, and wherein one group is a P-wave emission and receiving probe for measuring a P-wave velocity $V_{p90}$, for calculating the stiffness coefficient of the core sample $C_{11core}$; the other two groups are an orthogonally polarized S-wave emission and receiving probe, for measuring S-wave velocity $V_{s190}$ and $V_{s290}$, for calculating stiffness coefficients of the core sample $C_{44core}$ and $C_{66core}$; two groups of P-wave emission and receiving probes exist in the side of the core sample, and wherein one group is perpendicular to the bedding plane, for measuring the P-wave velocity $V_{p0}$, for calculating the stiffness coefficient of the core sample $C_{33core}$; one group is oriented at a 45 degree angle to the bedding plane, for measuring the P-wave velocity $V_{p45}$, for calculating the stiffness coefficient of the core sample $C_{13core}$.

Also, it is further necessary to calculate a volume density of the core sample in calculation formula as follows:

$$\rho_{core} = \frac{W_{sat\ core}}{V_{bulk\ core}} \quad (1)$$

wherein $\rho_{core}$ is a volume density of the core sample; $W_{sat\ core}$ is a weight of the core sample; $V_{bulk\ core}$ is a volume of the core sample.

Based on the calculation result of the wave velocity and the volume density obtained from the acoustic anisotropy measurement, calculating the stiffness coefficients of the core sample in the concrete formula as follows:

$$C_{33core} = \rho_{core} V_{p0}^2 \quad (2)$$

$$C_{11core} = \rho_{core} V_{p90}^2 \quad (3)$$

$$C_{44core} = \rho_{core} V_{s190}^2 \quad (4)$$

$$C_{66core} = \rho_{core} V_{s290}^2 \quad (5)$$

a P-wave anisotropy coefficient refer to a parameter proposed by Thomsen in 1986 for describing a P-wave velocity anisotropy feature, a S-wave anisotropy coefficient refer to a parameter proposed by Thomsen in 1986 for describing a S-wave velocity anisotropy feature, to be specific, referring to the paper "Weak elastic anisotropy: Geophysics. Vol. 51, 1986".

The expression formula of P-wave anisotropy coefficient of the core sample is:

$$\varepsilon_{core} = \frac{C_{11core} - C_{33core}}{2 \cdot C_{33core}} \quad (6)$$

where $\varepsilon_{core}$ is a P-wave anisotropy coefficient of the core sample.

The expression formula of S-wave anisotropy coefficient of the core sample is:

$$\gamma_{core} = \frac{C_{66core} - C_{44core}}{2 \cdot C_{44core}} \quad (7)$$

where $\gamma_{core}$ is a S-wave anisotropy coefficient of the core sample.

Referring to the industrial standard SY/T 5163-2010 for the method used for X diffraction measurement for core. The clay content information of the core sample is obtained through an X diffraction experiment.

Based on the P-wave and S-wave anisotropy coefficient of the core sample and the clay content data thereof, setting up two groups of experimental relationship, respectively, wherein the first group takes the clay content of the core sample as an independent variable, and takes the P-wave anisotropy coefficient of the core sample as a dependent variable in the expression formula as follows:

$$\varepsilon_{core} = k_1 \cdot V_{CL\ core}^{n_1} \quad (8)$$

where $V_{CL\ core}$ is the clay content of the core sample; $k_1$, $n_1$ are variable parameters. The second group takes the clay content of the core sample as an independent variable, and takes the S-wave anisotropy coefficient of the core sample as a dependent variable in the expression formula as follows:

$$\gamma_{core} = k_2 \cdot V_{CL\ core}^{n_2} \quad (9)$$

where $k_2$, $n_2$ are variable parameters.

Setting up a relation of stiffness coefficients of the core sample $C_{11core}$ and $C_{33core}$, and $C_{44core}$ and $C_{66core}$, in particular: taking combined parameters $$\frac{C_{66core} - C_{44core}}{2 \cdot C_{44core}}$$

based on such two parameters as $C_{44core}$ and $C_{66core}$ as an independent variable, taking $$\frac{C_{11core} - C_{33core}}{2 \cdot C_{33core}}$$

based on such two parameters as $C_{11core}$ and $C_{33core}$ as a dependent variable, setting up a relation therebetween in a concrete expression formula as follows:

$$\frac{C_{11core} - C_{33core}}{2 \cdot C_{33core}} = m \cdot \frac{C_{66core} - C_{44core}}{2 \cdot C_{44core}} + r \quad (10)$$

wherein m, r are variable parameters.

When calculating the clay content of the formation, it is possible to use the natural gamma logging curve of target layers of target wells for calculation in formula as follows:

$$V_{CL\ formation} = \frac{GR - GR_{min}}{GR_{max} - GR_{min}} \quad (11)$$

where $V_{CL\ formation}$ is the clay content of the formation of the current depth point;

GR is a natural gamma logging curve value of the current depth point;

$GR_{min}$ is a natural gamma characteristic value of target layer clean sandstone interval;

$GR_{max}$ is a natural gamma characteristic value of target layer clean mudstone interval.

An optimization algorithm can also be adopted by utilizing more well logging information (natural gamma; acoustic waves; neutron; density; uranium, thorium, potassium curve in natural gamma energy spectrum information; deep & shallow resistivity curve) of target layers of target wells to calculate polymineralic lithological profile, thereby obtaining the clay content of the formation, or other methods are adopted by utilizing one or more well logging information of target layers of target wells to calculate the clay content of the formation.

Calculating the stiffness coefficient of the formation $C_{33\ formation}$ by using the P-wave velocity and volume density well logging curves of the target layers of target wells in the formula as follows:

$$C_{33\ formation} = \rho_{formation} V_p^2 \quad (12)$$

where $\rho_{formation}$ is the volume density of the formation, and $V_p$ is the P-wave velocity of the formation;

Calculating the stiffness coefficient of the formation $C_{44\ formation}$ by using the S-wave velocity and volume density well logging curves of the target layers of target wells in the formula as follows:

$$C_{44\ formation} = \rho_{formation} V_s^2 \quad (13)$$

where $V_s$ is the S-wave velocity of the formation.

There are two methods of calculating stiffness coefficients of the formation $C_{11\ formation}$ and $C_{66\ formation}$: the first one is first calculating $C_{11\ formation}$ followed by $C_{66\ formation}$. Computing the stiffness coefficient of the formation $C_{11\ formation}$ along depth continuously based on a relation of an anisotropy coefficient of the P-wave of the core sample and its clay content, the clay content of the formation and the stiffness coefficient of the formation $C_{33\ formation}$; and computing the stiffness coefficient of the formation $C_{66\ formation}$ along depth continuously based on a relation of the stiffness coefficients of the core sample $C_{11core}$ and $C_{33core}$, $C_{44core}$ and $C_{66core}$ and the stiffness coefficients of the formation $C_{33\ formation}$, $C_{44\ formation}$ and $C_{11\ formation}$.

For example, based on the relation (8) of the P-wave anisotropy coefficient and its clay content, the calculation formula (6) of the P-wave anisotropy coefficient and the calculation formula (12) of stiffness coefficient of the formation $C_{33\ formation}$, the calculation formula of the stiffness coefficient of the formation $C_{11\ formation}$ finally obtained is as follows:

$$C_{11\ formation} = C_{33\ formation}(2\varepsilon+1) = \rho_{formation} V_p^2 (2k_1 \cdot V_{CL\ formation}^{n_1} + 1) \quad (14)$$

Based on the relational expression (10) of the stiffness coefficients of the core sample $C_{11core}$ and $C_{33core}$, $C_{44core}$ and $C_{66core}$, the calculation formula (12) of the stiffness coefficient of the formation $C_{33\ formation}$, the calculation formula (13) of $C_{44\ formation}$, and the calculation formula (14) of $C_{11\ formation}$, the calculation formula of the stiffness coefficient of the formation $C_{66\ formation}$ finally obtained is as follows:

$$C_{66\ formation} = \frac{(C_{11\ formation} - r) \cdot C_{44\ formation}}{m \cdot C_{33\ formation}} = \frac{[\rho_{formation} V_p^2 (2k_1 \cdot V_{CL\ formation}^{n_1} + 1) - r] \cdot \rho_{formation} V_s^2}{m \cdot \rho_{formation} V_p^2} \quad (15)$$

wherein $V_{CL\ formation}$ is the clay content of the formation.

The second one is first calculating $C_{66\ formation}$, followed by $C_{11\ formation}$. For example, computing the stiffness coefficient of the formation $C_{66\ formation}$ along depth continuously based on a relation of anisotropy coefficient of S-wave of the core sample and its clay content, the clay content of the formation and the stiffness coefficient of the formation $C_{44\ formation}$; computing the stiffness coefficient of the formation $C_{11\ formation}$ along depth continuously based on a relation of the stiffness coefficients of water-saturated core sample $C_{11core}$ and $C_{33core}$, $C_{44core}$ and $C_{66core}$, the stiffness coefficients of the formation $C_{33\ formation}$, $C_{44\ formation}$ and $C_{66\ formation}$.

For example, based on the relation (9) of the S-wave anisotropy coefficient and its clay content, the calculation formula (7) of the S-wave anisotropy coefficient and the calculation formula (13) of the formation anisotropy coefficient $C_{44\ formation}$, the calculation formula of the stiffness coefficient of the formation $C_{66\ formation}$ finally obtained is as follows:

$$C_{66\ formation} = C_{44\ formation}(2\gamma+1) = \rho_{formation} V_s^2 (2k_2 \cdot V_{CL\ formation}^{n_2} + 1) \quad (16)$$

Based on the relational expression (10) of the stiffness coefficients of the core sample $C_{11core}$ and $C_{33core}$, $C_{44core}$ and $C_{66core}$, the calculation formula (12) of the stiffness coefficient of the formation $C_{33\ formation}$ and the calculation formula (16) of the stiffness coefficient of the formation $C_{66\ formation}$, the calculation formula of the stiffness coefficient of the formation $C_{11\ formation}$ finally obtained is as follows:

$$C_{11\ formation} = m \frac{C_{33\ formation} \cdot C_{66\ formation}}{C_{44\ formation}} + r = m\rho_{formation} V_p^2 (2k_2 \cdot V_{CL\ formation}^{n_2} + 1) + r \quad (17)$$

Taking a formation (slow formation) adjacent to hydrocarbon source formation interval of important exploration well in tight oil and gas reservoirs as an example for detailed illustration of the technical solution of the present invention.

In the first step, drilling a plunger-like core sample in the direction parallel to formation bedding coring in this important well full-diameter drilling well, performing an individual core acoustic anisotropy measurement and a volume density calculation after the obtained horizontal plunger-like core sample is water saturated, obtaining stiffness coefficients of horizontal plunger-like core sample and anisotropy coefficients of S-wave and P-wave, as shown in Table 1.

TABLE 1

Stiffness Coefficients of Horizontal Plunger-like Core Sample and Anisotropy Coefficients of S-wave and P-wave

| No. of Sample | Stiffness Coefficients | | | | | Anisotropy Coefficient of P-wave | Anisotropy Coefficient of S-wave |
|---|---|---|---|---|---|---|---|
| | $C_{11core}$ | $C_{33core}$ | $C_{44core}$ | $C_{66core}$ | $C_{13core}$ | | |
| 1 | 16.43 | 11.70 | 4.73 | 6.43 | 4.57 | 0.20 | 0.18 |
| 2 | 50.61 | 40.79 | 15.47 | 18.43 | 8.67 | 0.12 | 0.10 |
| 3 | 63.65 | 52.51 | 18.55 | 23.30 | 24.58 | 0.11 | 0.13 |
| 4 | 56.42 | 39.53 | 14.56 | 21.89 | 18.61 | 0.21 | 0.25 |

TABLE 1-continued

Stiffness Coefficients of Horizontal Plunger-like Core Sample and Anisotropy Coefficients of S-wave and P-wave

| No. of Sample | Stiffness Coefficients | | | | | Anisotropy Coefficient of P-wave | Anisotropy Coefficient of S-wave |
|---|---|---|---|---|---|---|---|
| | $C_{11core}$ | $C_{33core}$ | $C_{44core}$ | $C_{66core}$ | $C_{13core}$ | | |
| 5 | 72.28 | 60.27 | 21.16 | 26.24 | 26.19 | 0.10 | 0.12 |
| 6 | 64.70 | 60.91 | 22.25 | 23.97 | 19.49 | 0.03 | 0.04 |
| 7 | 67.82 | 60.60 | 20.60 | 22.92 | 17.23 | 0.06 | 0.06 |
| 8 | 55.31 | 52.95 | 19.42 | 20.62 | 14.84 | 0.02 | 0.03 |
| 9 | 63.60 | 60.37 | 21.51 | 23.81 | 18.47 | 0.03 | 0.05 |
| 10 | 64.72 | 49.00 | 17.71 | 23.42 | 11.06 | 0.16 | 0.16 |

In the second step, performing an X diffraction measurement for horizontal plunger-like core sample obtained in the first step, obtaining the clay content of every horizontal plunger-like core sample, as shown in Table 2.

TABLE 2

Clay Content of Horizontal Plunger-like Core Sample

| No. of Sample | Clay Content (%) |
|---|---|
| 1 | 33.00 |
| 2 | 29.30 |
| 3 | 31.80 |
| 4 | 31.50 |
| 5 | 27.10 |
| 6 | 11.80 |
| 7 | 17.80 |
| 8 | 8.90 |
| 9 | 9.40 |
| 10 | 40.70 |

In the third step, setting up a relation of anisotropy coefficient of P-wave and clay content according to Table 1 and Table 2 as follows:

$$\varepsilon_{core} = 0.001 V_{CL\ core}^{1.43} \quad (18)$$

Based on Table 1 and Table 2, setting up a relation of anisotropy coefficient of S-wave and the clay content as follows:

$$\gamma_{core} = 0.0031 V_{CL\ core}^{1.10} \quad (19)$$

In the fourth step, based on the measurement in the first step and the calculated stiffness coefficients of the horizontal plunger-like core sample, setting up an experimental relation of $C_{11core}$ and $C_{33core}$, $C_{44core}$ and $C_{66core}$ as follows:

$$C_{11core} = \frac{C_{33core} \cdot C_{66core}}{C_{44core}} \quad (20)$$

Namely, in this example, a slope m=1, an intercept r=0.

Figure 3:
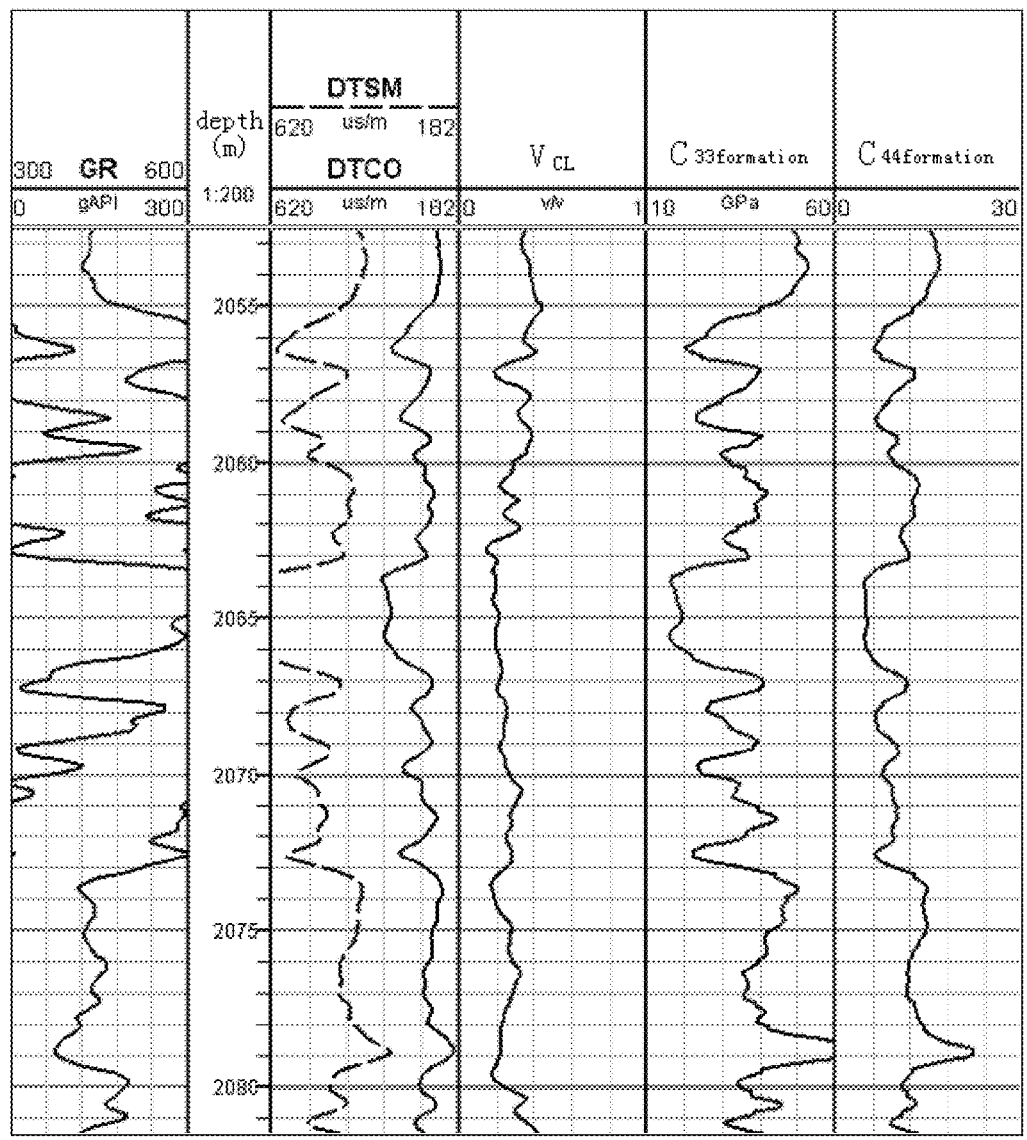
FIG. 3 is a schematic diagram of calculation result of clay content and stiffness coefficients $C_{33}$ and $C_{44}$ in examples of the present invention.

In the fifth step, calculating the clay content of the formulation by utilizing the natural gamma logging curve of target layers of target wells and the formula (11);

In the sixth step, computing the stiffness coefficients of the formation $C_{33\ formation}$ and $C_{44\ formation}$ along depth continuously by utilizing P-wave and S-wave velocity and volume density curves according to the formula (12) and the formula (13), the result is as shown in FIG. 3. Wherein the GR in the first track is a natural gamma curve value in gAPI; a second track is a depth track, and the third track displays interval transit time, wherein DTSM is shear wave slowness, and DTCO is compressional wave slowness in us/m; $V_{CL}$ in the fourth track is the clay content of the formation; and the fifth and sixth tracks respectively display the stiffness coefficients of the formation $C_{33\ formation}$ and $C_{44\ formation}$ in Gpa calculated by interval transit time and density curve.

Figure 4:
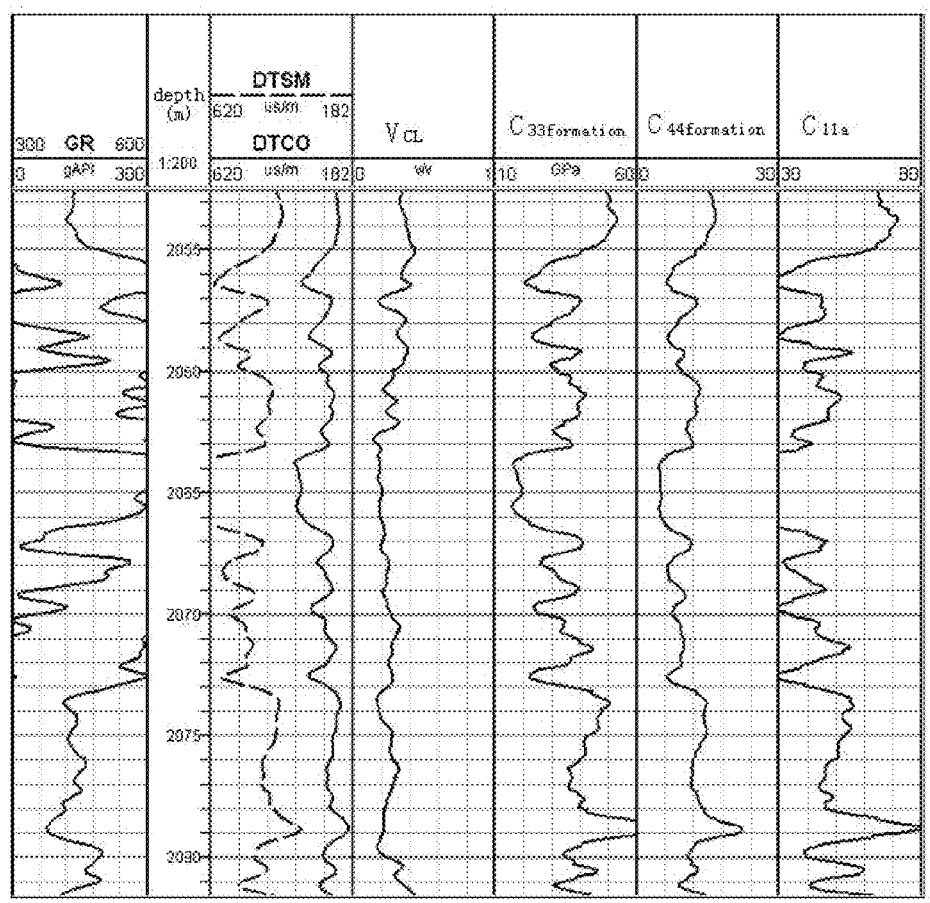
FIG. 4, FIG. 7 are schematic diagrams of calculation result of stiffness coefficient $C_{11}$ in examples of the present invention.

In the seventh step, adopting the first method which first calculates $C_{11\ formation}$ followed by $C_{66\ formation}$: substituting the obtained clay content of the formation into the formula (18), obtaining an anisotropy coefficient of P-wave of the formation, then obtaining the stiffness coefficient of the formation $C_{11\ formation}$, designated as $C_{11a}$ based on the formula (14) and the stiffness coefficient of the formation $C_{33\ formation}$, the calculation result is as shown in FIG. 4.

Figure 5:
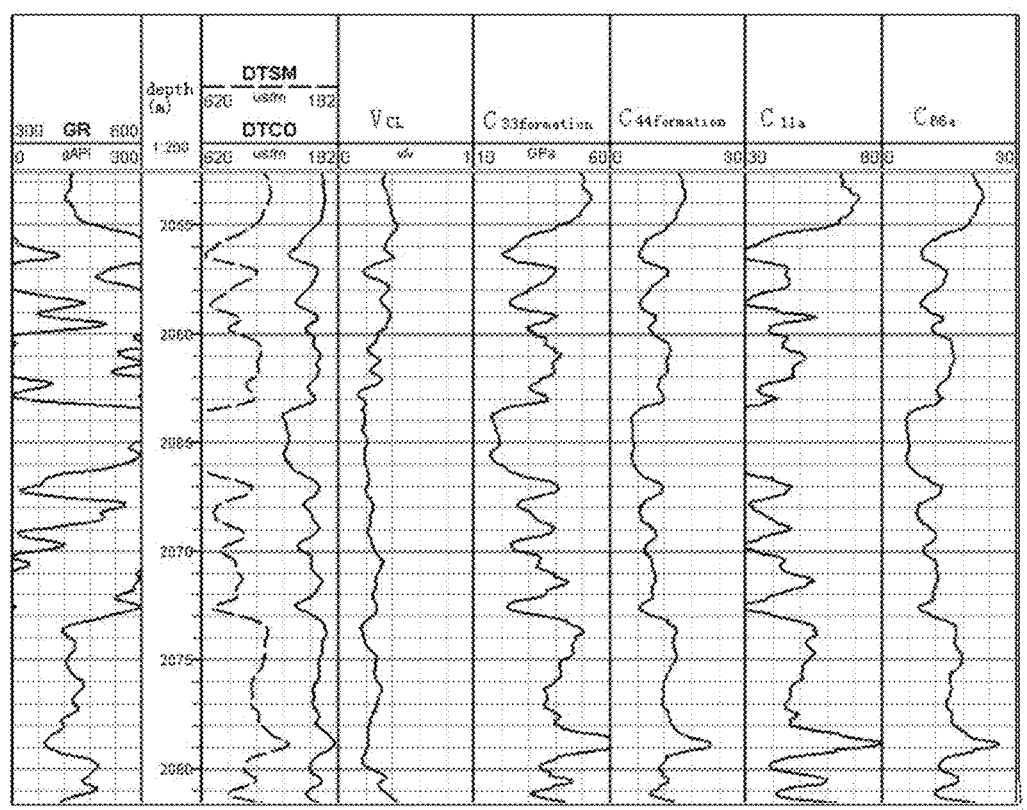
FIG. 5, FIG. 6 are schematic diagrams of calculation result of stiffness coefficient $C_{66}$ in examples of the present invention.

Based on the formula (15) and stiffness coefficients of the formation $C_{33\ formation}$, $C_{44\ formation}$ and $C_{11\ formation}$, finally obtaining the stiffness coefficient of the formation $C_{66\ formation}$, designated as $C_{66a}$, the calculation result is as shown in FIG. 5.

Figure 6:
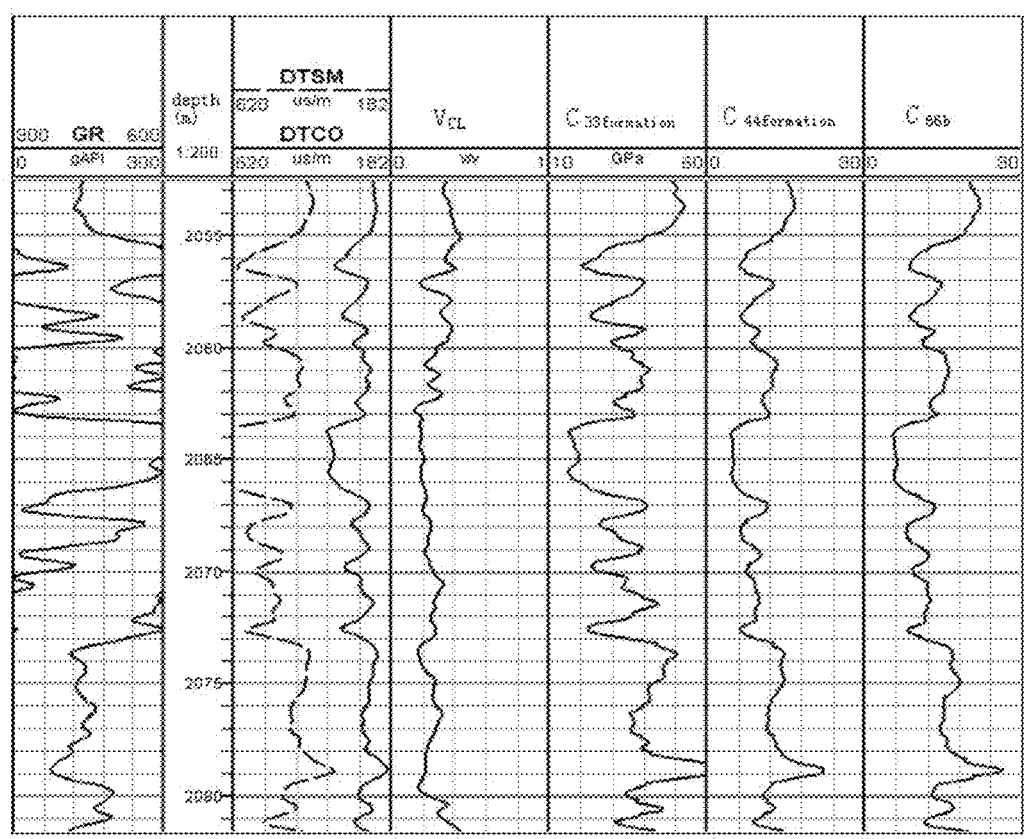

Alternatively, adopting the second method which first calculates $C_{66\ formation}$ followed by $C_{11\ formation}$: substituting the obtained clay content of the formation into the formula (19), obtaining an anisotropy coefficient of S-wave of the formation, then obtaining the stiffness coefficient of the formation $C_{66\ formation}$, designated as $C_{66b}$ based on the formula (16) and the stiffness coefficient of the formation $C_{44\ formation}$. The result is as shown in FIG. 6.

Figure 7:
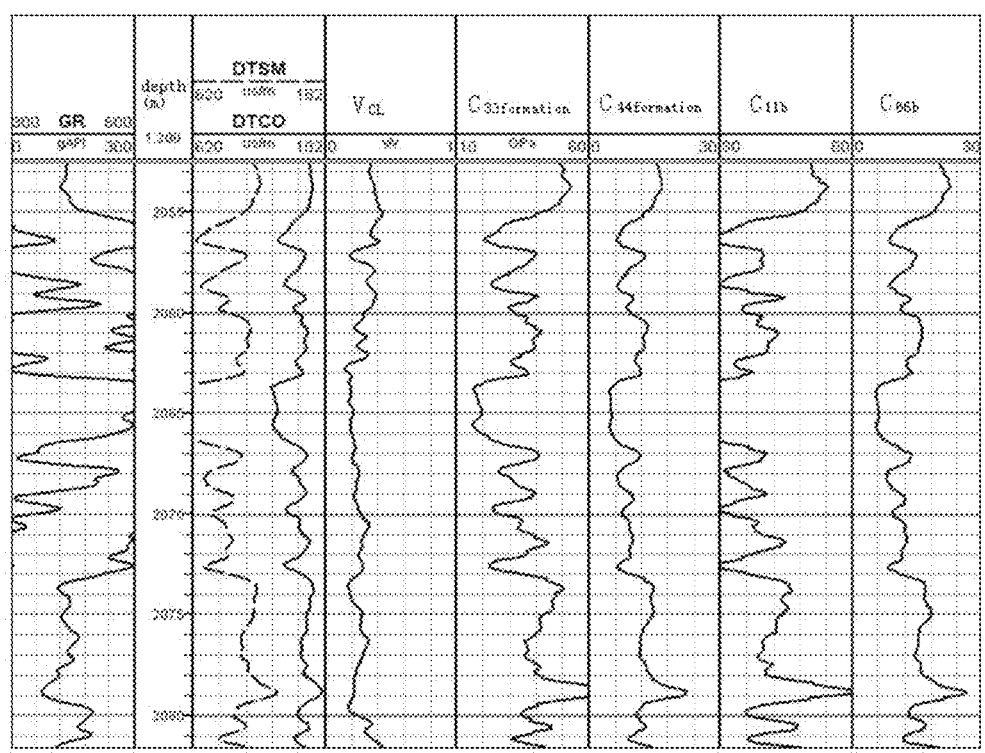

Based on the formula (17) and stiffness coefficients of the formation $C_{33\ formation}$, $C_{44\ formation}$ and $C_{66\ formation}$, finally obtaining the stiffness coefficient of the formation $C_{11\ formation}$, designated as $C_{11b}$, the calculation result is as shown in FIG. 7.

In the objective interval, utilizing a method of calculating a stiffness coefficient in prior art, that is, using a horizontal S-wave velocity to realize well logging characterization of stiffness coefficient $C_{66}$ in the formula as follows:

$$C_{66} = \rho V_{sh}^2 \quad (21)$$

where $\rho$ is a volume density well logging curve; $V_{sh}$ is a horizontal S-wave velocity extracted from stoneley well logging information.

Figure 8:
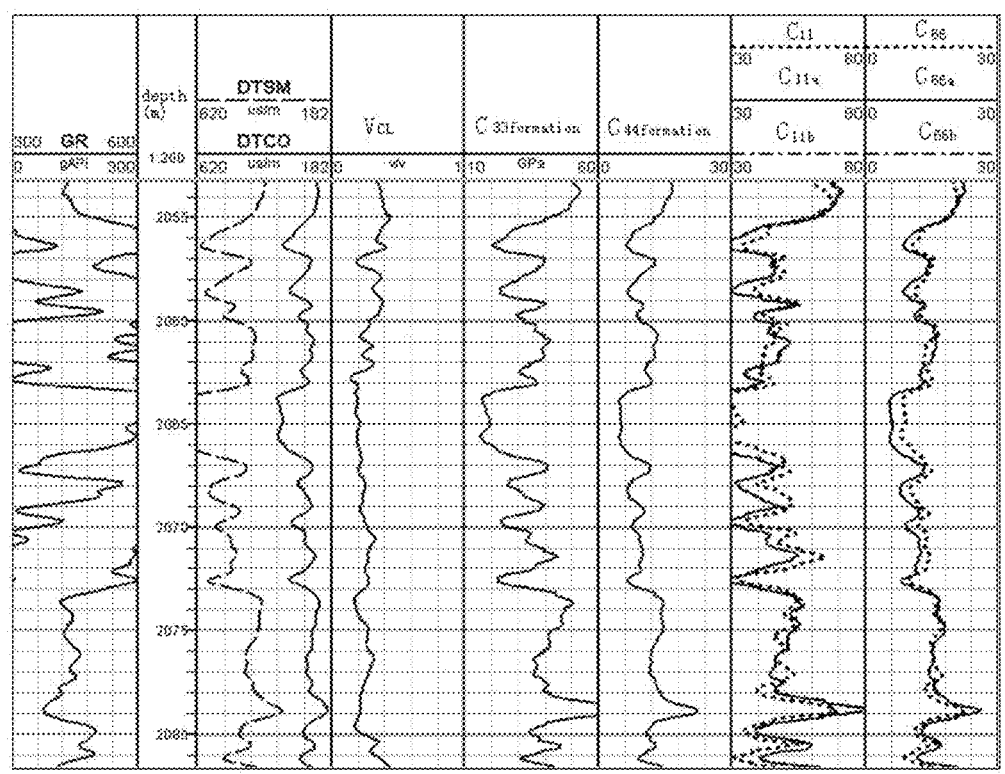
FIG. 8 is a comprehensive comparison schematic diagram of calculating stiffness coefficients results in different methods in examples of the present invention.

Comparing $C_{11}$ and $C_{66}$ obtained based on the horizontal S-wave velocity and experimental relationship with $C_{11a}$ and $C_{66a}$ obtained in the first method and $C_{11b}$, $C_{66b}$ obtained in the second method, the comparison result is as shown in FIG. 8. As can be seen from FIG. 8, $C_{11a}$ and $C_{11b}$ obtained by using two methods provided in the present invention are in a close agreement, and $C_{66a}$ and $C_{66b}$ are also in a close agreement. It can also be seen in FIG. 8 that the stiffness coefficient $C_{66}$ obtained by using the horizontal S-wave velocity extracted from stoneley wave logging information is also in a close agreement with $C_{66a}$ and $C_{66b}$. The $C_{11}$ obtained based on the horizontal S-wave velocity and the experimental relation is also basically matched with $C_{11a}$ and $C_{11b}$, this illustrates in the case of no horizontal S-wave velocity, use of the present invention also can obtain the stiffness coefficients $C_{66}$ and $C_{11}$ in compliance with the exact circumstances, and since the extraction process of horizontal S-wave velocity is avoided, the present invention has a wider scope of application than the previous method (the previous method can only apply to slow formation).

In sum, it is unnecessary to utilize a horizontal S-wave velocity inversed from stoneley waves when calculating stiffness coefficients by utilizing the method provided by the present invention, and hence a horizontal S-wave extraction process is avoided so that the calculation is simple and effective; the method provided by the present invention applies to a calculation of stiffness coefficients of fast formation besides slow formation, and has a wider scope of application.

It is understood that the preferred examples described above are for illustrative purposes only and not construed as limiting the invention. Numerous variations and modifications of detail within the reach of a person skilled in the art can be made to the examples of the present invention. Thus, it is intended that the present invention covers any changes, alternatives, and modifications of this invention provided they come within the spirit and principle of the appended claims and their equivalents.

The invention claimed is:

1. A method of determining stiffness coefficients of formation, comprising:
   setting up a relation of stiffness coefficients of formation $C_{11}$ and $C_{33}$, $C_{44}$, $C_{66}$ based on stiffness coefficients of a formation core sample; computing clay content of formation along depth continuously based on formation logging information; computing the stiffness coefficient of formation $C_{33}$ along depth continuously based on a P-wave velocity and a volume density of the formation; computing the stiffness coefficient of formation $C_{44}$ along depth continuously based on a S-wave velocity and a volume density of the formation; and
   computing the stiffness coefficient of the formation $C_{11}$ along depth continuously based on a relation of an anisotropy coefficient of the P-wave of the formation and its clay content, the clay content of the formation, and the stiffness coefficient of the formation $C_{33}$, and further computing the stiffness coefficient of the formation $C_{66}$ along depth continuously based on the relation of the stiffness coefficients of the formation $C_{11}$ and $C_{33}$, $C_{44}$, $C_{66}$ and the stiffness coefficients of the formation $C_{11}$, $C_{33}$, $C_{44}$; or
   alternatively, computing the stiffness coefficient of the formation $C_{66}$ along depth continuously based on a relation of an anisotropy coefficient of the S-wave of the formation and its clay content, the clay content of the formation, and the stiffness coefficient of the formation $C_{44}$, and further computing the stiffness coefficient of the formation $C_{11}$ along depth continuously based on the relation of the stiffness coefficients of the formation $C_{11}$ and $C_{33}$, $C_{44}$, $C_{66}$ and the stiffness coefficients of the formation $C_{33}$, $C_{44}$, $C_{66}$.

2. The method according to claim 1, wherein, setting up a relation of the stiffness coefficients of the formation $C_{11}$ and $C_{33}$, $C_{44}$, $C_{66}$ based on the stiffness coefficients of the formation core sample, comprising the relation of the stiffness coefficients of the formation $C_{11}$ and $C_{33}$, $C_{44}$, $C_{66}$ set up by following formula:

$$\frac{C_{11} - C_{33}}{2 \cdot C_{33}} = m \cdot \frac{C_{66} - C_{44}}{2 \cdot C_{44}} + r;$$

wherein m, r are variable parameters.

3. The method according to claim 1, wherein, computing the stiffness coefficient of the formation $C_{33}$ along depth continuously based on a P-wave velocity and a volume density of the formation, comprising calculating the stiffness coefficient of the formation $C_{33}$ in the following formula:

$$C_{33} = \rho V_P^2;$$

wherein $V_p$ is a P-wave velocity of the formation, and $\rho$ is a volume density of the formation.

4. The method according to claim 1, wherein, computing the stiffness coefficient of the formation $C_{44}$ along depth continuously based on an S-wave velocity and a volume density of the formation, comprising calculating the stiffness coefficient of the formation $C_{44}$ in the following formula:

$$C_{44} = \rho V_s^2;$$

wherein $V_s$ is a S-wave velocity of the formation, and $\rho$ is a volume density of the formation.

5. The method according to claim 1, wherein computing the stiffness coefficient of the formation $C_{11}$ along depth continuously is based on a relation of an anisotropy coefficient of P-wave of the formation and its clay content, the clay content of the formation, and the stiffness coefficient of the formation $C_{33}$, comprising calculating the stiffness coefficient of the formation $C_{11}$ in the following formula:

$$\varepsilon = k_1 \cdot V_{CL}^{n_1}$$

$$\varepsilon = \frac{C_{11} - C_{33}}{2 \cdot C_{33}};$$

wherein $\varepsilon$ is an anisotropy coefficient of the P-wave of the formation, $V_{CL}$ is the clay content of the formation, $k_1$, $n_1$ are variable parameters.

6. The method according to claim 1, wherein computing the stiffness coefficient of the formation $C_{66}$ along depth continuously is based on a relation of an anisotropy coefficient of S-wave of the formation and its clay content, the clay content of the formation, and the stiffness coefficient of the formation $C_{44}$, comprising calculating the stiffness coefficient of the formation $C_{66}$ in the following formula:

$$\gamma = k_2 \cdot V_{CL}^{n_2};$$

$$\gamma = \frac{C_{66} - C_{44}}{2 \cdot C_{44}};$$

wherein $\gamma$ is an anisotropy coefficient of the S-wave of the formation, $V_{CL}$ is the clay content of the formation, $k_2$, $n_2$ are variable parameters.

7. An apparatus of determining stiffness coefficients of formation, comprising a processor that is configured to:
   setting up a relation of stiffness coefficients of formation $C_{11}$ and $C_{33}$, $C_{44}$, $C_{66}$ based on stiffness coefficients of a formation core sample; computing clay content of the formation along depth continuously based on formation logging information; computing the stiffness coefficient of the formation $C_{33}$ along depth continuously based on a P-wave velocity and a volume density of the formation; computing the stiffness coefficient of the formation $C_{44}$ along depth continuously based on a S-wave velocity and a volume density of the formation; and computing the stiffness coefficient of the formation $C_{11}$ along depth continuously based on a relation of an anisotropy coefficient of the P-wave of the formation and its clay content, the clay content of the formation, and the stiffness coefficient of the formation $C_{33}$, and further computing the stiffness coefficient of the formation $C_{66}$ along depth continuously based on the relation of the stiffness coefficients of the formation $C_{11}$ and $C_{33}$, $C_{44}$, $C_{66}$ and the stiffness coefficients of the formation $C_{11}$, $C_{33}$, $C_{44}$; or alternatively, computing the stiffness coefficient of the formation $C_{66}$ along depth continuously based on a relation of an anisotropy coefficient of the S-wave of the formation and its clay content, the clay content of the formation, and the stiffness coefficient of the formation $C_{44}$, and further computing the stiffness coefficient of the formation $C_{11}$ along depth continuously based on the relation of the stiffness coefficients of the formation $C_{11}$ and $C_{33}$, $C_{44}$, $C_{66}$ and the stiffness coefficients of the formation $C_{33}$, $C_{44}$, $C_{66}$.

8. The apparatus according to claim 7, wherein that, the processor is configured to set up a relation of the stiffness coefficients of the formation $C_{11}$ and $C_{33}$, $C_{44}$, $C_{66}$ in the following formula:

$$\frac{C_{11} - C_{33}}{2 \cdot C_{33}} = m \cdot \frac{C_{66} - C_{44}}{2 \cdot C_{44}} + r;$$

wherein m, r are variable parameters.

9. The apparatus according to claim 7, wherein that, the processor is configured to calculate the stiffness coefficient of the formation $C_{33}$ in the following formula:

$$C_{33} = \rho V_p^2;$$

wherein $V_p$ is the P-wave velocity of the formation, $\rho$ is the volume density of the formation.

10. The apparatus according to claim 7, wherein that, the processor is configured to calculate the stiffness coefficient of the formation $C_{44}$ in the following formula:

$$C_{44} = \rho V_s^2;$$

wherein $V_s$ is the S-wave velocity of the formation, $\rho$ is the volume density of the formation.

11. The apparatus according to claim 7, wherein computing the stiffness coefficient of the formation $C_{11}$ along depth continuously is based on a relation of an anisotropy coefficient of P-wave of the formation and its clay content, the clay content of the formation, and the stiffness coefficient of the formation $C_{33}$, the processor is configured in the following formula:

$$\varepsilon = k_1 \cdot V_{CL}^{n_1};$$

$$\varepsilon = \frac{C_{11} - C_{33}}{2 \cdot C_{33}};$$

wherein $\varepsilon$ is an anisotropy coefficient of the P-wave of the formation, $V_{CL}$ is the clay content of the formation, $k_1$, $n_1$ are variable parameters.

12. The apparatus according to claim 7, wherein computing the stiffness coefficient of the formation $C_{66}$ along depth continuously is based on a relation of an anisotropy coefficient of S-wave of the formation and its clay content, the clay content of the formation, and the stiffness coefficient of the formation $C_{44}$, the processor is configured in the following formula:

$$\gamma = k_2 \cdot V_{CL}^{n_2};$$

$$\gamma = \frac{C_{66} - C_{44}}{2 \cdot C_{44}};$$

wherein $\gamma$ is an anisotropy coefficient of the S-wave of the formation, $V_{CL}$ is the clay content of the formation, $k_2$, $n_2$ are variable parameters.

* * * * *